(12) United States Patent
Bae (10) Patent No.: US 7,216,401 B2
(45) Date of Patent: May 15, 2007

(54) HINGE ASSEMBLY AND HOUSING

(75) Inventor: Byung-Woog Bae, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 136 days.

(21) Appl. No.: 10/961,182

(22) Filed: Oct. 12, 2004

(65) Prior Publication Data

US 2005/0078818 A1    Apr. 14, 2005

(30) Foreign Application Priority Data

Oct. 13, 2003   (KR) .................... 10-2003-0071197

(51) Int. Cl.
*E05D 11/10* (2006.01)
*E05D 1/04* (2006.01)

(52) U.S. Cl. ..................... 16/324; 16/354; 16/262

(58) Field of Classification Search ................. 16/324, 16/354, 260–263, 285, 287, 386, 382, 388; 361/680, 681, 682, 683; 379/433.12, 433.13; 248/919–923; 348/373, 333.06; 455/575.1, 455/575.3, 550.1, 575.8, 90.3

See application file for complete search history.

(56) References Cited

U.S. PATENT DOCUMENTS

| | | | | |
|---|---|---|---|---|
| 4,342,135 A | * | 8/1982 | Matsuo et al. ................. | 16/82 |
| 4,385,418 A | * | 5/1983 | Loftis et al. .................... | 16/381 |
| 4,468,836 A | * | 9/1984 | Omata ............................ | 16/82 |
| 4,693,444 A | * | 9/1987 | Williams et al. ............ | 248/653 |

(Continued)

FOREIGN PATENT DOCUMENTS

EP         288667 A   *  11/1988

(Continued)

OTHER PUBLICATIONS

Japanese Office Action corresponding to Japanese Patent Application No. 2004-298632, issued on Dec. 5, 2006.

*Primary Examiner*—Chuck Y. Mah
(74) *Attorney, Agent, or Firm*—Robert E. Bushnell, Esq.

(57) ABSTRACT

A hinge assembly adapted for a housing having a main body and a sub-body rotatably positioned on the main body, the hinge assembly including: a first hinge portion adapted to rotatably support both lower sides of the sub-body; and a second hinge portion adapted to rotatably support a rear surface of the sub-body with a surface contact and to maintain a rotated angle of the sub-body. The first hinge portion includes: a hinge protrusion arranged on one side surface of the sub-body; a hinge protrusion inserting-hole arranged on one side surface of a sub-body rotational space and adapted to receive the hinge protrusion; a hinge-hole arranged on the other side surface of the sub-body; a through-hole arranged on the other side surface of a sub-body rotational space to correspond to the hinge-hole; and a hinge locker passing through the through-hole and the hinge-hole. The second hinge portion includes: a curved portion protruding from a bottom surface of the sub-body and having a gear groove arranged on the surface thereof; a window arranged on the sub-body rotational space of the main body and passing through the curved portion; and a pinion rotatably positioned at a predetermined position, the pinion arranged to be rotated together with the sub-body upon the sub-body being rotated in engagement with the gear groove.

10 Claims, 9 Drawing Sheets

U.S. PATENT DOCUMENTS

| | | | | |
|---|---|---|---|---|
| 5,102,084 A | * | 4/1992 | Park | 248/286.1 |
| 5,168,426 A | * | 12/1992 | Hoving et al. | 361/681 |
| 5,168,429 A | * | 12/1992 | Hosoi | 361/680 |
| 5,187,743 A | | 2/1993 | Gumb et al. | |
| 5,265,309 A | * | 11/1993 | Oille | 16/262 |
| 5,402,150 A | * | 3/1995 | Stiles | 345/168 |
| 5,507,072 A | * | 4/1996 | Youn | 16/261 |
| 5,704,094 A | * | 1/1998 | Hartigan et al. | 16/303 |
| 5,724,704 A | * | 3/1998 | Seo | 16/254 |
| 5,761,297 A | | 6/1998 | Kingsbury et al. | |
| 5,796,576 A | * | 8/1998 | Kim | 361/681 |
| 5,987,122 A | * | 11/1999 | Daffara et al. | 379/433.13 |
| 6,088,447 A | * | 7/2000 | Aggus et al. | 379/428.03 |
| 6,351,535 B1 | | 2/2002 | Nogas et al. | |
| 6,445,793 B1 | | 9/2002 | Vassallo et al. | |
| 6,618,903 B2 | | 9/2003 | Kim | |
| 6,775,883 B2 | * | 8/2004 | Pan et al. | 16/284 |
| 2002/0092129 A1 | | 7/2002 | Brewington et al. | |
| 2003/0163900 A1 | | 9/2003 | Rode et al. | |
| 2003/0221288 A1 | | 12/2003 | Kim et al. | |

FOREIGN PATENT DOCUMENTS

| | | | | |
|---|---|---|---|---|
| JP | 2-121773 | | | 10/1990 |
| JP | 03137379 | A | * | 6/1991 |
| JP | 2001-51750 | | | 2/2001 |
| JP | 2002-100883 | | | 4/2002 |
| JP | 2002-207536 | | | 7/2002 |
| JP | 2003-29241 | | | 1/2003 |
| JP | 2003-110248 | | | 4/2003 |
| JP | 2003-152348 | | | 5/2003 |
| JP | 2003-269440 | | | 9/2003 |
| JP | 2004007272 | A | * | 1/2004 |
| JP | 2005273739 | A | * | 10/2005 |

* cited by examiner

HINGE ASSEMBLY AND HOUSING

CLAIM OF PRIORITY

This application makes reference to, incorporates the same herein, and claims all benefits accruing under 35 U.S.C. § 119 from an application for HINGE ASSEMBLY AND HOUSING earlier filed in the Korean Intellectual Property Office on 13 Oct. 2003 and there duly assigned Serial No. 2003-71197.

BACKGROUND OF THE INVENTION

1. Field of the Invention

The present invention relates to a hinge assembly adapted for use with a housing having a sub-body positioned on a main body at an adjustable angle and, more particularly, to a hinge assembly adapted for use with a housing, the hinge assembly increasing the accuracy of an angle adjustment and increasing its strength by improving a structure for rotating the sub-body. The present invention also relates to a housing having such a hinge assembly.

2. Description of the Related Art

Generally, in devices such as a telephone (for example, a key-phone terminal), a printer, etc., a liquid crystal display (hereinafter referred to as an "LCD") is used to display an operation mode or an operation state of the device as a user presses a button, etc. of the device.

The LCD is designed to allow its angle with respect to a main body of the device housing to be adjusted, thereby facilitating convenience of its use.

U.S. Pat. No. 6,618,903, entitled "Hinge Device," issued on Sep. 16, 2003, relates to an angle adjustment device of an LCD. The patent recites a foldable appliance which comprises a main body, an openable sub-body positioned on the main body and a hinge device for hinging the sub-body to the main body, the hinge device comprising: a hinge shaft having one end mounted to the sub-body and the other end mounted to the main body, wherein the one end is movably fixed together with the sub-body, and the other end partially passes through the main body to run at idle; a fixed disk, penetrated by the other end of the hinge shaft and fixed to the main body, having at least one notch and at least one protrusion continued from the notch, on an opposite surface of a surface contacted with the main body; a movable disk penetrated by the other end of the hinge shaft, surface contacted with the fixed disk, and positioned to rotate together with the hinge shaft, the movable disk having at least one protrusion extending from a surface contacted with the fixed disk; elastic means positioned to axially press the movable disk; and fixing means for fixing the fixed disk, the movable disk and the elastic means penetrated by the hinge shaft.

However, such a hinge device has a problem in that its structure is very complex and manufacture and assembly thereof are very costly.

Furthermore, when the sub-body is maintained at a predetermined angle by a friction force of the disk, the hinge assembly has another problem in that the sub-body can move when the friction force is weak, and alternatively, a high force is required to move the main body when the friction force has been increased to prevent the sub-body from moving.

In addition, the hinge assembly has still another problem in that a spring back phenomenon occurs when the sub-body is rotated due to the friction force of the disk.

The following patents each discloses features in common with the present invention but do not teach or suggest the inventive features specifically recited in the present application: U.S. Pat. No. 5,187,743 to Gumb et al., entitled TELEPHONE BASE WITH A DISPLAY UNIT, issued on Feb. 16, 1993; U.S. Pat. No. 6,351,535 to Nogas et al., entitled VARIABLE ANGLE MECHANISM FOR DESKTOP TELEPHONE, issued on Feb. 26, 2002; U.S. Pat. No. 6,088,447 to Aggus et al., entitled TELEPHONE BASE INCLUDING VISUAL DISPLAY MODULE, issued on Jul. 11, 2000; U.S. Pat. No. 5,761,297 to Kingsbury et al., entitled INTERCONNECTION MECHANISM FOR A TILTABLE TELEPHONE DISPLAY UNIT, issued on Jun. 2, 1998; U.S. Pat. No. 6,445,793 to Vassallo et al., entitled ADJUSTABLE TELEPHONE SYSTEM AND METHOD, issued on Sep. 3, 2002; U.S. patent application No. 2003/0221288 to Kim et al., entitled HINGE ASSEMBLY FOR A FLAT DISPLAY MONITOR published on Dec. 4, 2003; U.S. patent application No. 2002/0092129 to Brewington et al., entitled TILT HINGE, published on Jul. 18, 2002; and U.S. patent application No. 2003/0163900 to Rude et al., entitled POP-UP FRICTION HINGE HAVING MULTIPLE LE VELS OF TORQUE, published on Sep. 4, 2003.

SUMMARY OF THE INVENTION

It is, therefore, an object of the present invention to provide a hinge assembly adapted for use with a housing, the hinge assembly having a simplified angle adjustment structure.

It is another object of the present invention to provide a hinge assembly in which a spring back phenomenon does not occur when a sub-body angle is adjusted.

It is further another object of the present invention to provide a hinge assembly for facilitating an angle adjustment of the sub-body.

It is also an object of the present invention to provide a housing having a hinge assembly including a simplified angle adjustment structure.

According to an aspect of the present invention, hinge assembly is provided, the hinge assembly being adapted for a housing having a main body and a sub-body rotatably positioned on the main body, the hinge assembly comprising: a first hinge portion adapted to rotatably support both lower sides of the sub-body; and a second hinge portion adapted to rotatably support a rear surface of the sub-body with a surface contact and to maintain a rotated angle of the sub-body.

Preferably, the first hinge portion comprises: a hinge protrusion arranged on one side surface of the sub-body; a hinge protrusion inserting-hole arranged on one side surface of a sub-body rotational space and adapted to receive the hinge protrusion; a hinge-hole arranged on the other side surface of the sub-body; a through-hole arranged on the other side surface of a sub-body rotational space to correspond to the hinge-hole; and a hinge locker passing through the through-hole and the hinge-hole.

Preferably, the hinge locker comprises: a horizontal portion having a seating surface arranged to be in contact with an inner surface of a side portion of the sub-body rotational space; a vertical portion having a shaft-forming surface arranged in a direction perpendicular to the seating surface; a hinge shaft protruding from an inner surface thereof, the hinge shaft being arranged to pass through the hinge-hole and the through-hole; and a hinge locker seating portion arranged on the inner surface of the side portion of the sub-body rotational space on which the horizontal portion of the hinge locker is seated.

Preferably, the horizontal portion of the hinge locker comprises a tension rib having a positioning protrusion arranged on one end thereof; and the hinge locker seating portion comprises a guide rib protruding therefrom, the guide rib adapted to guide and fix the positioning protrusion; and the guide rib comprises a front end having a locking groove arranged to lock the positioning protrusion.

Preferably, the second hinge portion comprises: a curved portion protruding from a bottom surface of the sub-body and having a gear groove arranged on the surface thereof; a window arranged on the sub-body rotational space of the main body and passing through the curved portion; and a pinion rotatably positioned at a predetermined position, the pinion arranged to be rotated together with the sub-body upon the sub-body being rotated in engagement with the gear groove.

Preferably, the hinge assembly further comprises a boss protruding from the inner surface of the main body from a rear side of the window and a bracket, wherein the pinion is arranged to be rotatable by the boss protruding from the inner surface of the main body from a rear side of the window and by the bracket supported by the boss at a predetermined height and rotatably supporting the shaft of the pinion.

Preferably, a positioning pin for fixing a mounting position of the bracket is arranged on one side of the boss; and the bracket comprises a fastening-hole arranged to have a fastening screw passing therethrough to fasten the bracket to the boss; and the bracket comprises a pinhole arranged on one side to receive the positioning pin.

Preferably, the gear grooves are arranged on both sides of the curved portion and at least two pinions are arranged to engage the gear grooves.

Preferably, the hinge assembly further comprises: ribs protruding from the side portion and the rear side of the window; and a rotation-preventing threshold arranged on an end portion of the curved portion to limit a rotation of the sub-body by interference with the rib arranged on the side portion of the window.

Preferably, the hinge assembly further comprises a finger inserting-hole arranged on one end of an upper surface of the main body comprising a sub-body rotational space.

According to another aspect of the present invention, a housing is provided, the housing comprising: a main body; a sub-body rotatably positioned on the main body; a first hinge portion adapted to rotatably support both lower sides of the sub-body; and a second hinge portion adapted to rotatably support a rear surface of the sub-body with a surface contact and to maintain a rotated angle of the sub-body.

Preferably, the first hinge portion comprises: a hinge protrusion arranged on one side surface of the sub-body; a hinge protrusion inserting-hole arranged on one side surface of a sub-body rotational space and adapted to receive the hinge protrusion; a hinge-hole arranged on the other side surface of the sub-body; a through-hole arranged on the other side surface of a sub-body rotational space to correspond to the hinge-hole; and a hinge locker passing through the through-hole and the hinge-hole.

Preferably, the hinge locker comprises: a horizontal portion having a seating surface arranged to be in contact with an inner surface of a side portion of the sub-body rotational space; a vertical portion having a shaft-forming surface arranged in a direction perpendicular to the seating surface; a hinge shaft protruding from an inner surface thereof, the hinge shaft being arranged to pass through the hinge-hole and the through-hole; and a hinge locker seating portion arranged on the inner surface of the side portion of the sub-body rotational space on which the horizontal portion of the hinge locker is seated.

Preferably, the horizontal portion of the hinge locker comprises a tension rib having a positioning protrusion arranged on one end thereof; and the hinge locker seating portion comprises a guide rib protruding therefrom, the guide rib adapted to guide and fix the positioning protrusion; and the guide rib comprises a front end having a locking groove arranged to lock the positioning protrusion.

Preferably, the second hinge portion comprises: a curved portion protruding from a bottom surface of the sub-body and having a gear groove arranged on the surface thereof; a window arranged on the sub-body rotational space of the main body and passing through the curved portion; and a pinion rotatably positioned at a predetermined position, the pinion arranged to be rotated together with the sub-body upon the sub-body being rotated in engagement with the gear groove.

Preferably, the housing further comprises a boss protruding from the inner surface of the main body from a rear side of the window and a bracket, wherein the pinion is arranged to be rotatable by the boss protruding from the inner surface of the main body from a rear side of the window and by the bracket supported by the boss at a predetermined height and rotatably supporting the shaft of the pinion.

Preferably, a positioning pin for fixing a mounting position of the bracket is arranged on one side of the boss; and the bracket comprises a fastening-hole arranged to have a fastening screw passing therethrough to fasten the bracket to the boss; and the bracket comprises a pinhole arranged on one side to receive the positioning pin.

Preferably, the gear grooves are arranged on both sides of the curved portion and at least two pinions are arranged to engage the gear grooves.

Preferably, the housing further comprises: ribs protruding from the side portion and the rear side of the window; and a rotation-preventing threshold arranged on an end portion of the curved portion to limit a rotation of the sub-body by interference with the rib arranged on the side portion of the window.

Preferably, the housing further comprises a finger inserting-hole arranged on one end of an upper surface of the main body comprising a sub-body rotational space.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully hereinafter with reference to the accompanying drawings, in which an exemplary embodiment of the present invention is shown. The present invention can, however, be embodied in different forms and should not be construed as being limited to the embodiment set forth herein. Rather, the embodiment is provided so that this disclosure will be thorough and complete, and will fully convey the scope of the invention to those skilled in the art. In the drawings, the thickness of layers and regions have been exaggerated for clarity. Like numbers refer to like elements throughout the specification.

Figure 1:
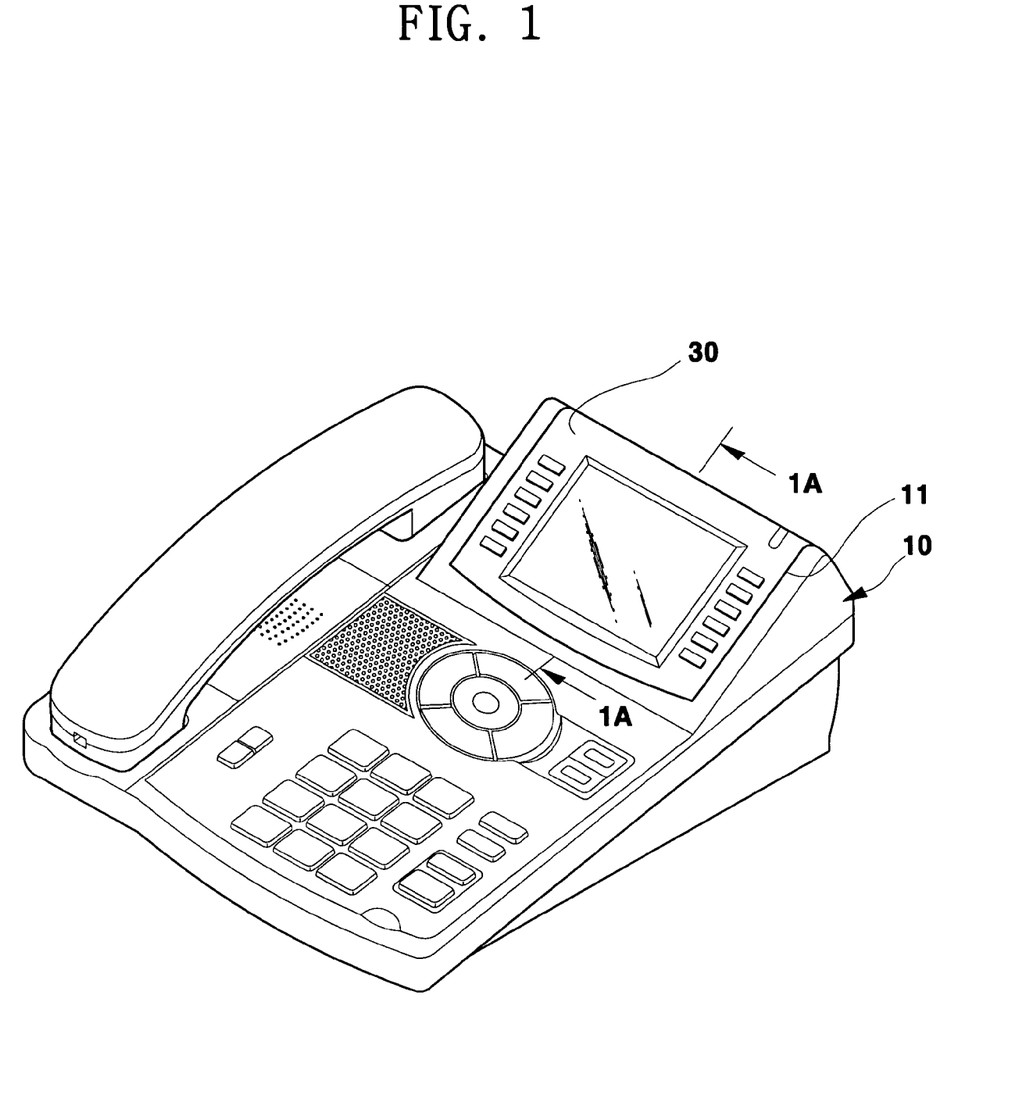
FIG. 1 is a perspective view of an electronic device (i.e.—a telephone) having an improved hinge assembly in accordance with an embodiment of the present invention.

As shown in FIG. 1, a sub-body 30 is positioned on a main body 10 to be adjustable (where, for example, the main body 10 corresponds to a main body of a telephone, and the sub-body 30 corresponds to an LCD module of the telephone).

Figure 2:
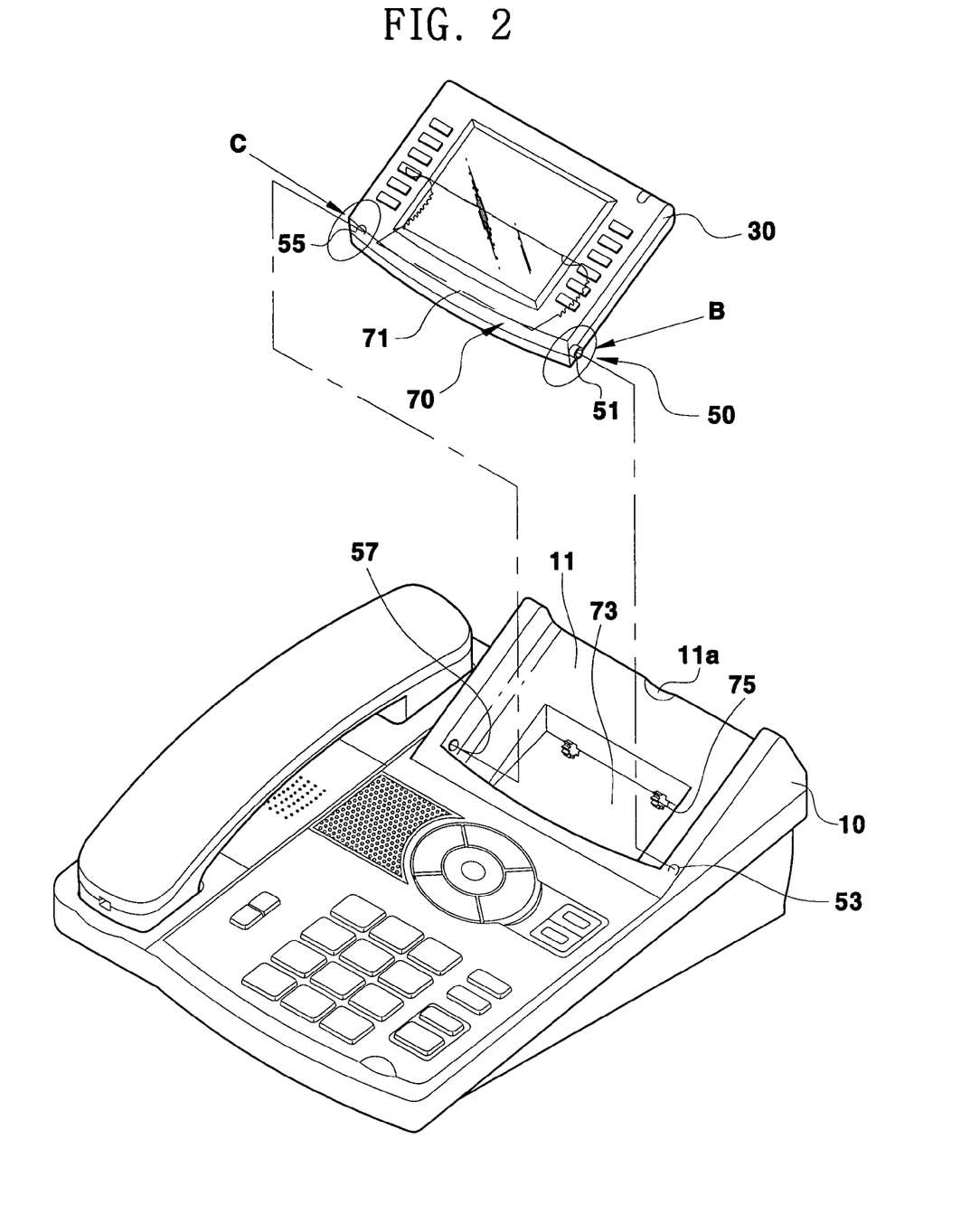
FIG. 2 is an exploded perspective view of the structure of FIG. 1 with a portion being partially separated.

As shown in FIG. 2, an upper surface of the main body 10 is provided with a sub-body rotational space 11 for rotatably receiving the sub-body 30. The sub-body 30 is rotatably supported on both lower sides by a first hinge portion 50, and rotatably supported by surface contact by a second hinge portion 70. The second hinge portion 70 functions to rotatably support the sub-body 30 and to maintain an angle of the rotated sub-body 30.

Figure 3A:
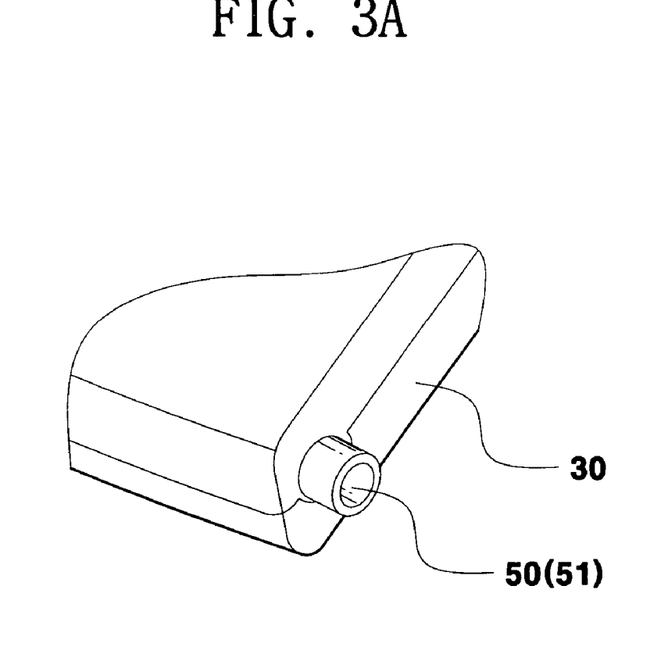
FIG. 3A is an enlarged view of portion B of FIG. 2.

The first hinge portion 50 is explained below in conjunction with FIGS. 2 and 3A–3B.

Figure 3B:
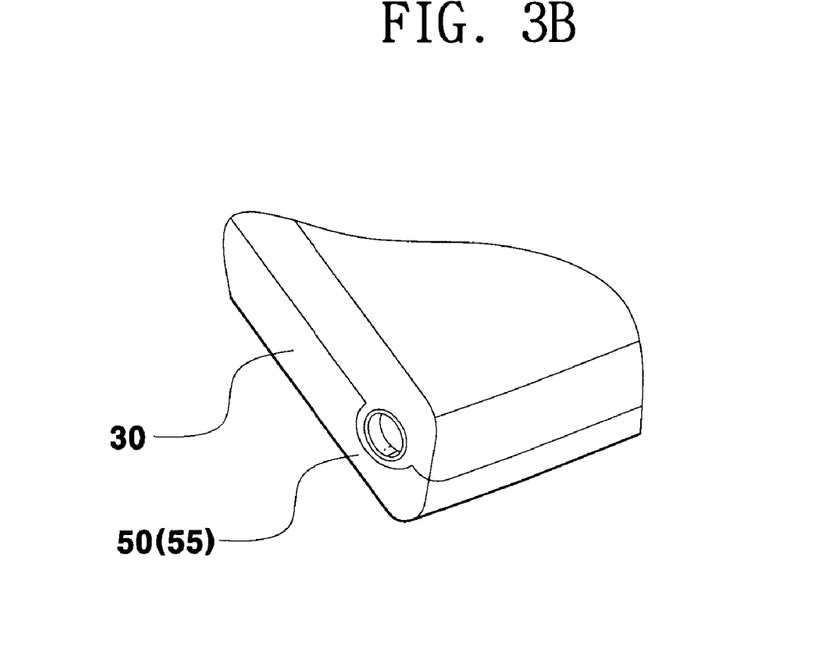
FIG. 3B is an enlarged view of portion C of FIG. 2.

As shown in FIGS. 2 to 3B, the first hinge portion 50 comprise a hinge protrusion 51 arranged on one side surface of the sub-body 30, a hinge protrusion inserting-hole 53 arranged on one side surface of the sub-body rotational space 11 to accommodate the hinge protrusion 51, a hinge-hole 55 arranged at the other side surface of the sub-body 30, a through-hole 57 arranged at the other side surface of the sub-body rotational space 11 to correspond to the hinge-hole 55, and a hinge locket 59 inserted through the through-hole 57 and the hinge-hole 55.

Figure 3C:
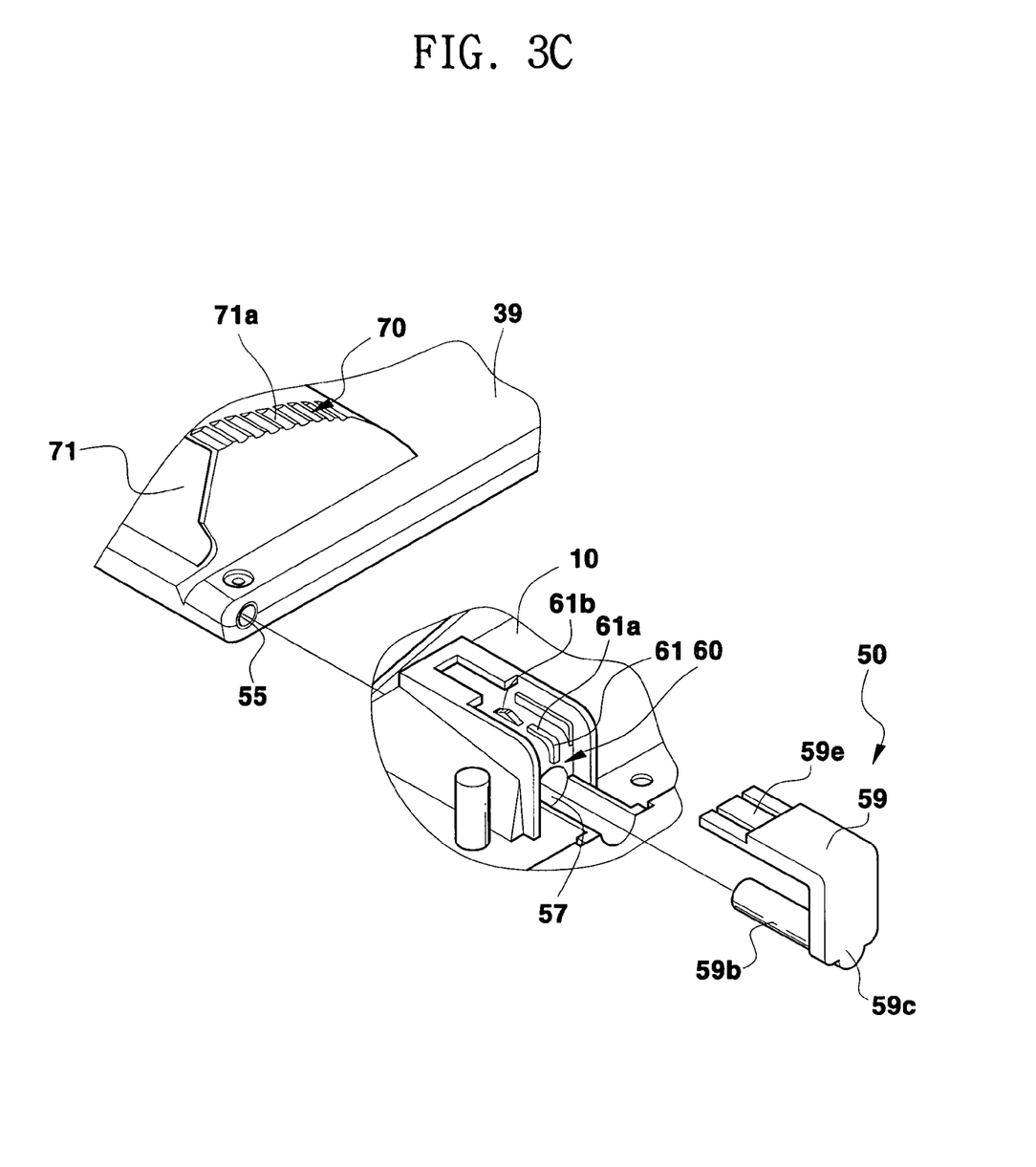
FIG. 3C is an assembled view when one side of the sub-body of FIG. 1 is hinged.
Figure 3D:
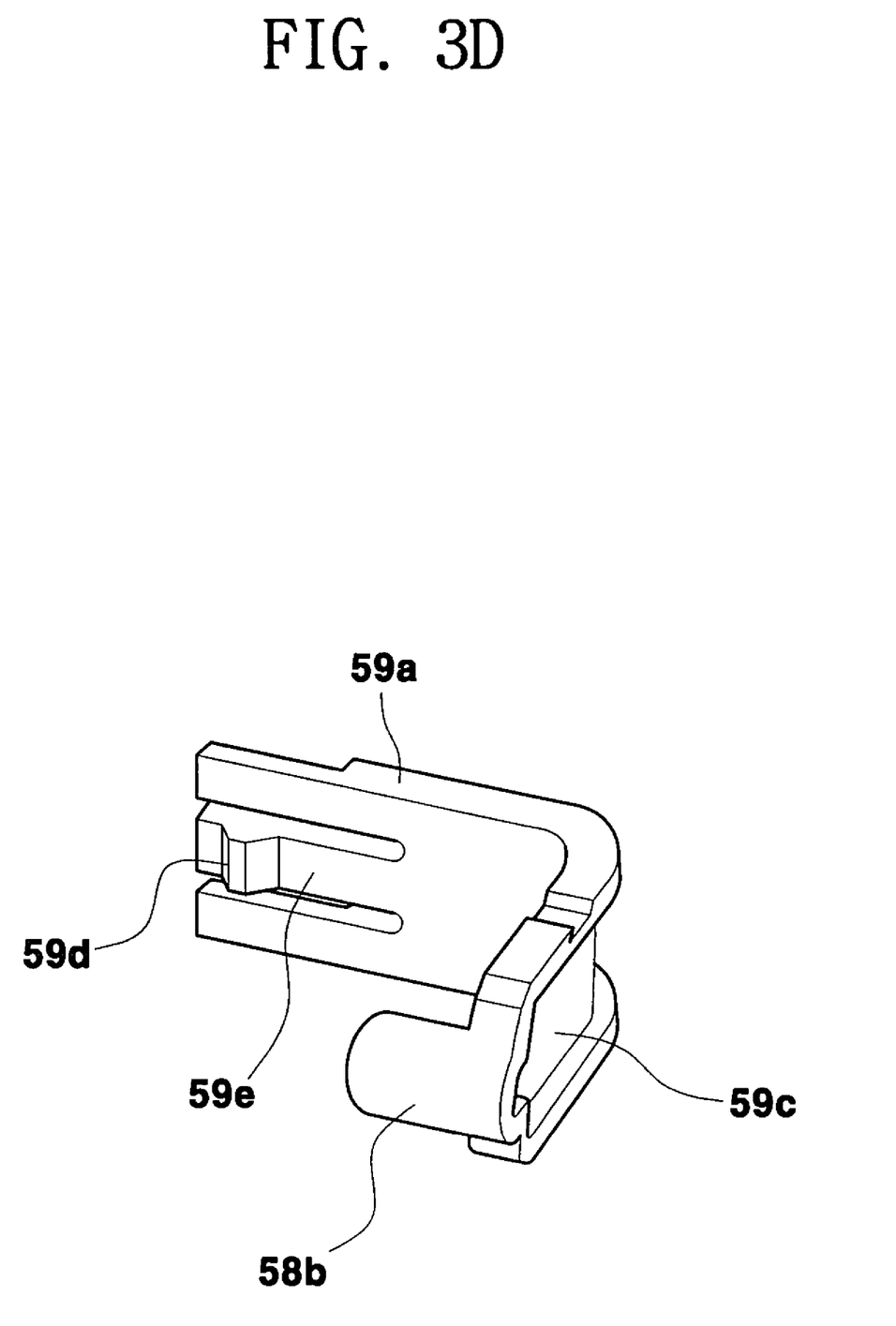
FIG. 3D is a perspective view of the hinge locker of FIG. 3C.

As shown in FIGS. 3C and 3D, the hinge locker 59 preferably comprises horizontal and vertical portions, the horizontal portion includes a seating surface 59a in contact with an inner surface of a side portion of the sub-body rotational space 11 of the main body 10 and the vertical portion includes a shaft-forming surface 59c arranged in a direction perpendicular to the seating surface 59a, and a hinge shaft 59b protruded from an inner surface thereof, the hinge shaft 59b being inserted through the hinge-hole 55 and the through-hole 57. Further, a hinge locker seating portion 61 on which the horizontal portion of the hinge locker 59 is seated is arranged on the inner surface of the side portion of the sub-body rotational space 11. The horizontal portion is provided with a tension rib 59e having a positioning protrusion 59d arranged on one end thereof. The hinge locker seating portion 61 is provided with a guide rib 61a protruded therefrom, the positioning protrusion 59d being guided and fixed by the guide rib 61a. A front end of the guide rib 61a is provided with a locking groove 61b to lock the positioning protrusion 59d. In this embodiment of the present invention, the hinge locker 59 is used to assemble the sub-body 30, thus facilitating the assembly and disassembly of the housing.

The second hinge portion 70 is explained below in conjunction with FIGS. 4A to 7.

Figure 4A:
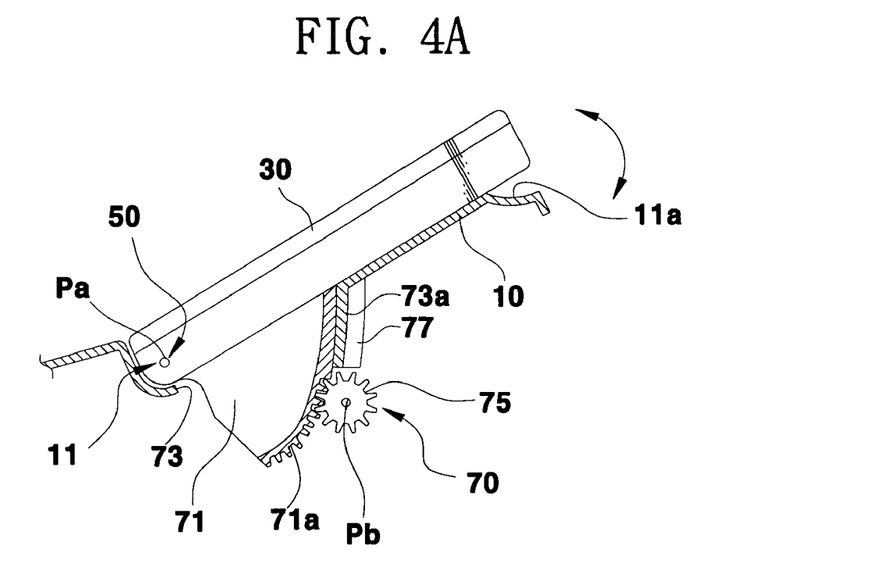
FIG. 4A is a cross-sectional view of line 1A—1A of FIG. 1.
Figure 4B:
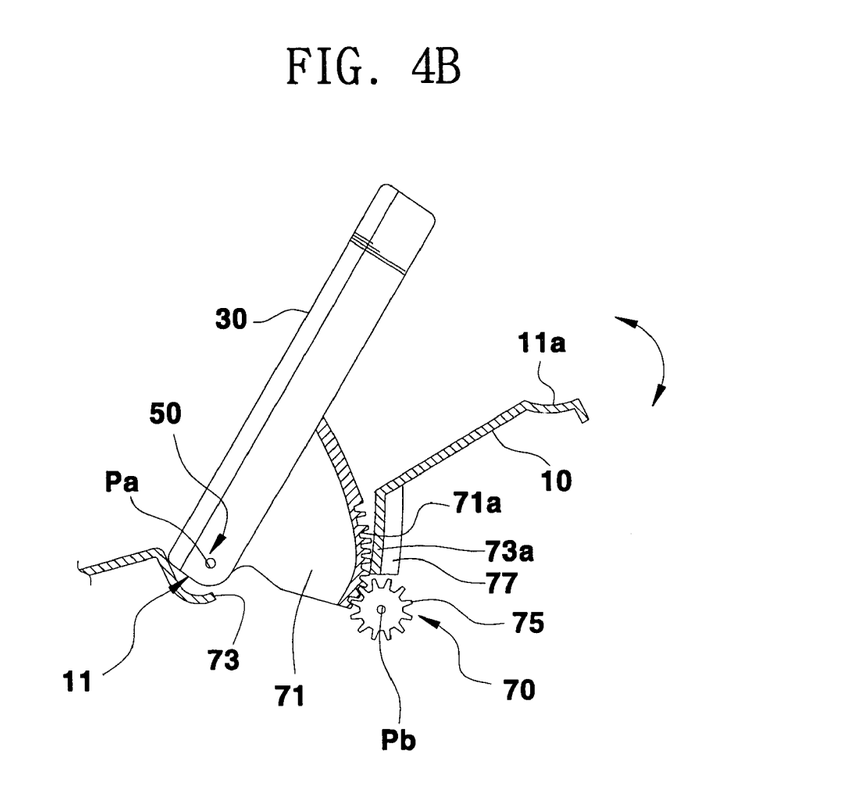
FIG. 4B is a view of a rotated sub-body.
Figure 5:
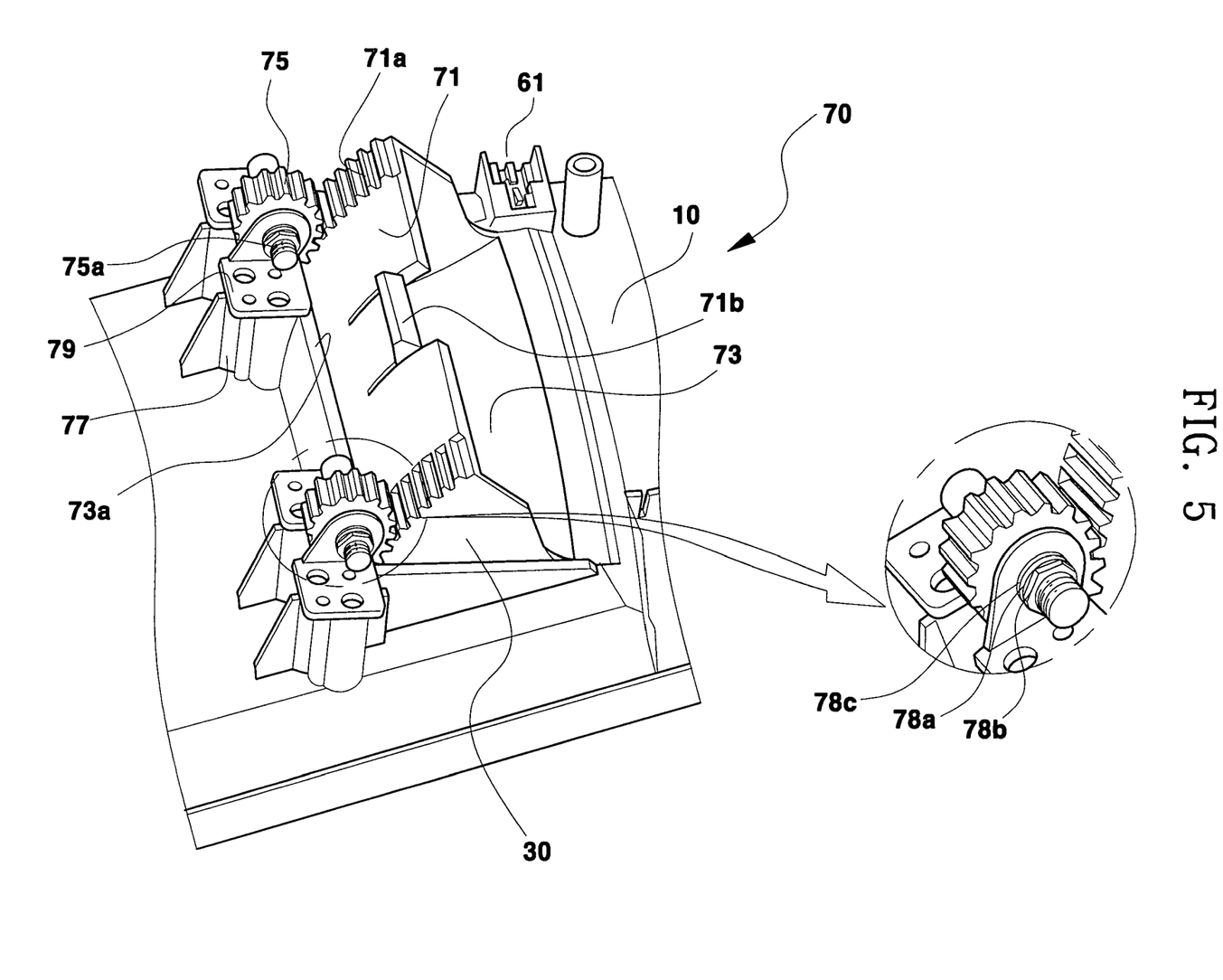
FIG. 5 is a perspective view of a rear surface when the sub-body is positioned with the main body.

As shown in FIGS. 4A to 7, the second hinge portion 70 comprises a curved portion 71 protruding from a bottom surface of the sub-body 30 and having a gear groove 71a arranged on the surface thereof, a window 73 arranged within the sub-body rotational space 11 and passing through the curved portion 71, and a pinion 75 rotatably positioned at a predetermined position to be rotated together with the sub-body 30 while the sub-body is rotated in engagement with the gear groove 71a. As shown in FIG. 5, the gear grooves 71a are preferably arranged on both sides of the curved portion 71, and at least two pinions 75 are positioned to correspond to the gear grooves 71.

Figure 6:
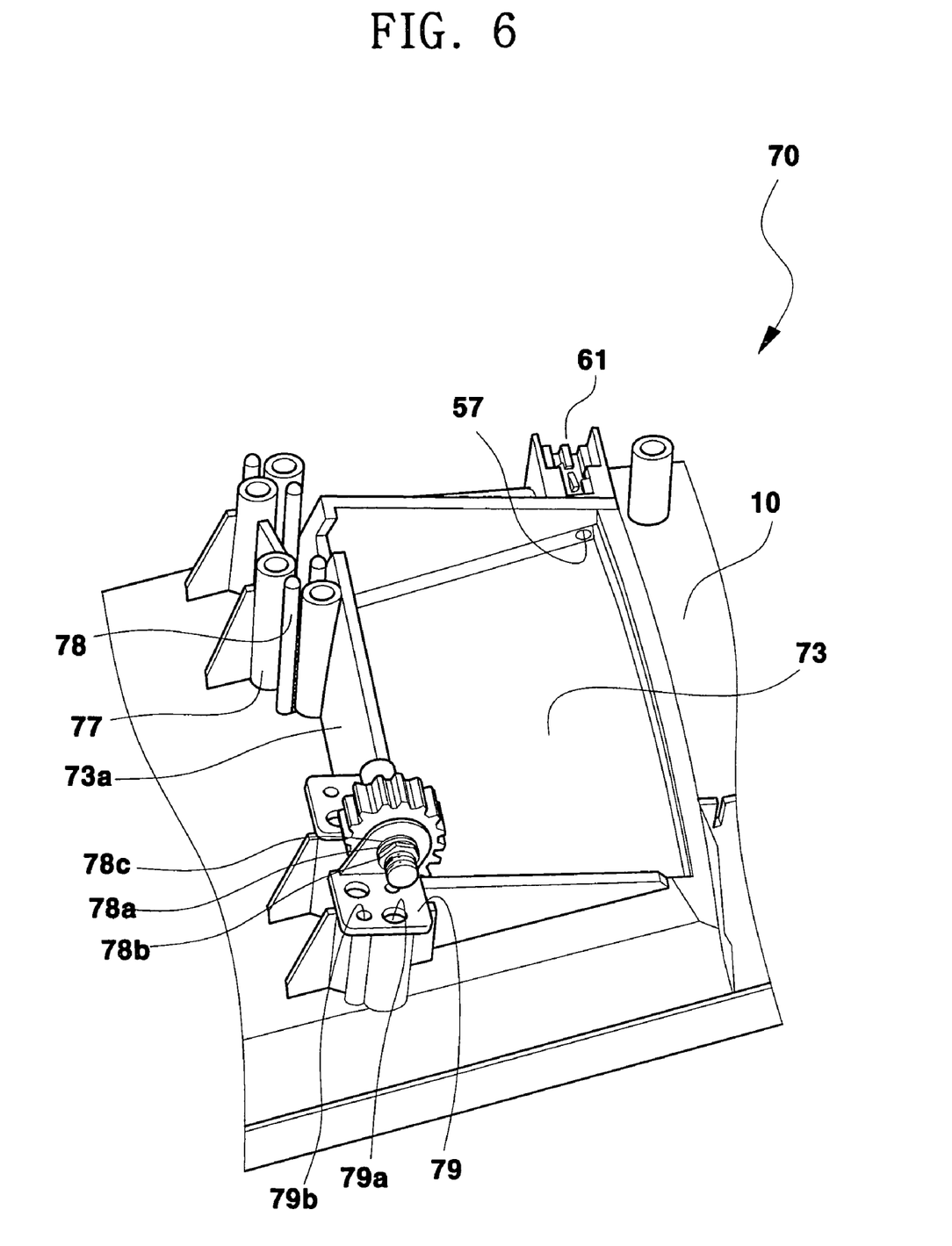
FIG. 6 is a view of a separated sub-body of FIG. 5.

As shown in FIGS. 5 and 6, the pinion 75 is rotatably positioned by a boss 77 protruding from the inner surface of the main body 10 from the rear side of the window 73, and a bracket 79 supported by the boss 77 at a predetermined height and rotatably supporting a shaft 75a of the pinion 75. Both ends of the shaft 75a are provided with a resilient unit 78a and a nut 78b. The nut 78b is affixed to the end of the shaft 75a to apply pressure to the resilient unit 78a, thus exerting a predetermined resilient force to adjust a rotational friction force between the shaft 75a and the bracket 79. The resilient unit 78a can use a spring washer, a Belleville spring, etc. Furthermore, a washer 78c is interposed at a contact portion of the shaft 75a and the bracket 79 and between the resilient unit 78a and the bracket 79 to allow the shaft 75a to be smoothly rotated.

As shown in FIG. 6, a positioning pin 78 is additionally arranged on one side of the boss 77; the bracket 79 is provided with a fastening-hole 79a and is fastened to the boss 77 by a fastening screw (not shown) passing through the fastening-hole 79a. The bracket 79 is also provided with a pinhole 79b for accommodating the positioning pin 78. The bracket 79 is maintained in an aligned state at a predetermined position through the pinhole 79b and the positioning pin 78 to facilitate a fastening operation.

Figure 7:
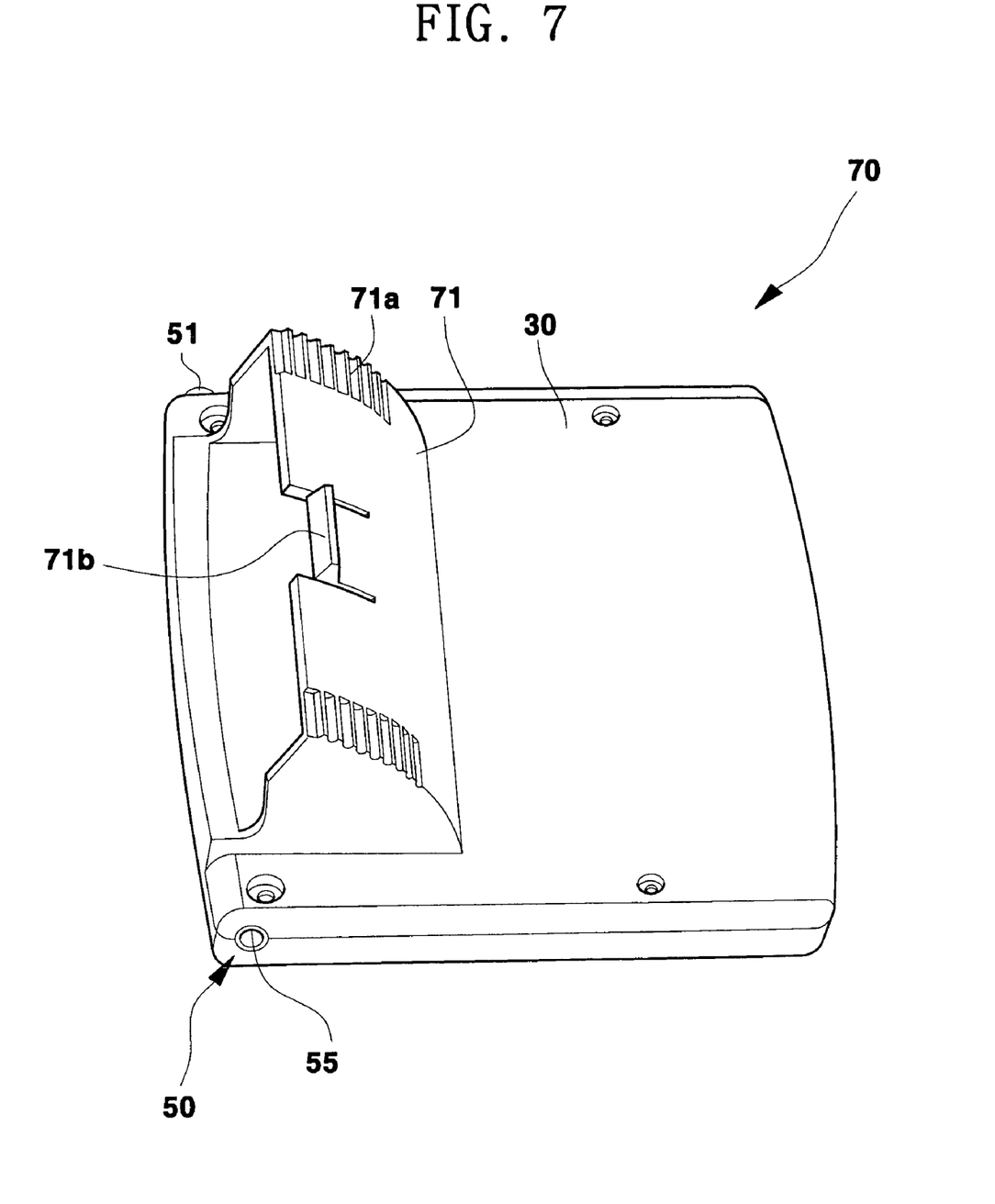
FIG. 7 is a view of a rear surface of the sub-body.

As shown in FIGS. 5 and 7, rib 73a protrudes from the side portion and the rear side of the window 73, and a rotation-preventing threshold 71b is arranged at an end portion of the curved portion 71 for limiting the rotation of the sub-body 30 by interference with the rib 73a.

As shown in FIG. 2, 4A and 4B, a finger inserting-hole 11a is additionally arranged at one end of an upper surface of the sub-body rotational space 11 to more easily move the sub-body 30.

The operation of the hinge assembly in accordance with an embodiment of the present invention is more specifically described below.

First, when a user applies pressure to an upper surface of the sub-body 30 with his hand in order to adjust an angle of the sub-body 30, the sub-body 30 is rotated with both sides thereof forming a hinge point via the hinge protrusion 51 and the hinge shaft 59b of the hinge locker 59 composing the first hinge portion 50.

At the same time, the sub-body 30 is in surface contact with the second hinge portion 70 to be supported with respect to the rotation, and, when the rotating operation is stopped, the sub-body 30 is supported to maintain a predetermined angle. To be more specific, the gear groove 71a of the curved portion 71 protruding from the bottom surface of the sub-body 30 is rotated in surface contact along a peripheral surface of the pinion 75 rotated about the shaft 75a.

Rotation occurs when a force rotated by pressing the sub-body 30 is greater than a rotational friction force of the bracket 79 and the shaft 75a fastened by the nut 78b affixed to the shaft 75a of the pinion 75. Therefore, when a user releases the force pressing toward the sub-body 30, a magnitude of the rotational friction force becomes larger than the rotational force by a self-weight of the sub-body 30 to maintain the angle of the sub-body 30.

On the other hand, even though the sub-body 30 rotates, the rotation preventing threshold 71b arranged at a front end of the curved portion 71 of the sub-body 30 contacts the rib 73a arranged at the rear edge portion of the window 73 to prevent the sub-body from rotating further.

Since the sub-body 30 rotated in this manner is rotatably supported at two positions (designated as Pa and Pb in FIGS. 4A and 4B), a phenomenon in which the sub-body 30 is moved or pushed back can be minimized when the rotating operation is accomplished as the force biased to the sub-body 30 is divided into the two positions. That is, because the conventional sub-body is supported by one position, when a user presses the button in order to handle an adjustment key arranged at the sub-body 30, the force of the user causes the phenomenon in which the sub-body 30 is pushed back. However, as the sub-body 30 is secondarily supported in surface contact through the gear groove 71a and the pinion 75 of the curved portion 71, the phenomenon in which the sub-body 30 is moved or pushed back can be reduced.

While the telephone is described as an example in the above-mentioned configuration, the present invention can be adapted to various types of electronic devices such as a copier, a facsimile machine, a portable terminal, a printer, etc., having a moveable module.

As described hereinabove, the present invention provides an advantage of more stably accomplishing an angle adjustment of the sub-body by employing a first hinge portion to connect both sides of the sub-body, and a second hinge portion to rotatably support the bottom surface of the sub-body by surface contact.

Furthermore, the present invention improves an assembly's performance and reduces its fabrication and assembly costs due to a simple hinge assembly structure.

While this invention has been described in connection with an example embodiment, it is to be understood that the present invention is not limited to the disclosed embodiment, but on the contrary, the present invention is intended to cover various modifications and substitutions within the spirit and the scope of the appended claims.

What is claimed is:

1. An assembly comprising:
a main body and a sub-body rotatably positioned on the main body;
a hinge assembly connecting the main body to the sub-body, the hinge assembly including:
a first hinge portion adapted to rotatably support first and second lower sides of the sub-body, the first and second lower sides being on a face of the sub-body facing the main body; and
a second hinge portion adapted to rotatably support a rear end of the sub-body with a surface contact and to maintain a rotated angle of the sub-body, the sub-body having two ends, a front end having an axis of rotation and a rear end;
wherein the first hinge portion comprises:
a hinge protrusion arranged on a surface of the first side of the sub-body,
a hinge protrusion inserting-hole arranged on a rotational space accommodating the first side surface of the sub-body and adapted to receive the hinge protrusion;
a hinge-hole arranged on a surface of the second side of the sub-body;
a through-hole arranged on a rotational space accommodating the second side surface of the sub-body to correspond to the hinge-hole; and
a hinge locker passing through the through-hole and the hinge-hole; and
wherein the hinge locker comprises:
a horizontal portion having a seating surface arranged to be in contact with an inner surface of the sub-body;
a vertical portion having a shaft-forming surface arranged in a direction perpendicular to the seating surface;
a hinge shaft protruding perpendicularly from the shaft-forming surface thereof, the hinge shaft being arranged to pass through the hinge-hole and the through-hole; and
a hinge locker seating portion arranged on the inner surface of the sub-body to receive the seating surface of the horizontal portion of the hinge locker.

2. The assembly according to claim 1, wherein the horizontal portion of the hinge locker comprises a tension rib having a positioning protrusion arranged on one end thereof;
and wherein the hinge locker seating portion comprises a guide rib protruding therefrom, the guide rib adapted to guide and fix the positioning protrusion;
and wherein the guide rib comprises a front end having a locking groove arranged to lock the positioning protrusion.

3. An assembly comprising:
a main body and a sub-body rotatably positioned on the main body;
a hinge assembly connecting the main body to the sub-body, the hinge assembly including:
a first hinge portion adapted to rotatably support first and second lower sides of the sub-body, the first and second lower sides being on a face of the sub-body facing the main body; and
a second hinge portion adapted to rotatably support a rear end of the sub-body with a surface contact and to maintain a rotated angle of the sub-body, the sub-body having two ends, a front end having an axis of rotation and a rear end;
wherein the second hinge portion comprises:
a curved portion protruding from a bottom surface of the sub-body and having gear grooves arranged on the surface thereof;
a window arranged on the sub-body rotational space of the main body and passing through the curved portion; and
a pinion rotatably positioned at a predetermined position, the pinion arranged to be rotated together with the sub-body upon the sub-body being rotated in engagement with the gear grooves;
wherein the assembly further comprises a boss protruding from the inner surface of the main body from a rear side of the window and a bracket, wherein the pinion has a shaft and is arranged to be rotatable by the boss protruding from the inner surface of the main body from a rear side of the window and by the bracket supported by the boss at a predetermined height and rotatably supporting the shaft of the pinion; and wherein a positioning pin for fixing a mounting position of the bracket is arranged on one side of the boss;

and wherein the bracket comprises a fastening-hole arranged to have a fastening screw passing therethrough to fasten the bracket to the boss; and wherein the bracket comprises a pinhole arranged on one side to receive the positioning pin.

4. The assembly according to claim 3, wherein the curved portion has two sets of gear grooves, each set of gear grooves being arranged near a respective edge of the curved portion and wherein at least two pinions are arranged to respectively engage the two sets of gear grooves.

5. An assembly comprising:

a main body and a sub-body rotatably positioned on the main body;

a hinge assembly connecting the main body to the sub-body, the hinge assembly including:

a first hinge portion adapted to rotatably support first and second lower sides of the sub-body, the first and second lower sides being on a face of the sub-body facing the main body; and a second hinge portion adapted to rotatably support a rear end of the sub-body with a surface contact and to maintain a rotated angle of the sub-body, the sub-body having two ends, a front end having an axis of rotation and a rear end;

wherein the second hinge portion comprises:

a curved portion protruding from a bottom surface of the sub-body and having gear grooves arranged on the surface thereof;

a window arranged on the sub-body rotational space of the main body and passing through the curved portion; and a pinion rotatably positioned at a predetermined position, the pinion arranged to be rotated together with the sub-body upon the sub-body being rotated in engagement with the gear grooves; and wherein the hinge assembly further comprises:

a rib protruding from the main body; and a rotation-preventing threshold arranged on an end portion of the curved portion to limit a rotation of the sub-body by interference with the rib protruding from the main body.

6. A housing comprising:

a main body and a sub-body rotatably positioned on the main body;

a first hinge portion adapted to rotatably support first and second lower sides of the sub-body, the first and second lower sides being on a face of the sub-body facing the main body; and a second hinge portion adapted to rotatably support a rear end of the sub-body with a surface contact and to maintain a rotated angle of the sub-body, the sub-body having two ends, a front end having an axis of rotation and a rear end;

wherein the first hinge portion comprises:

a hinge protrusion arranged on a surface of the first side of the sub-body, a hinge protrusion inserting-hole arranged on a rotational space accommodating the first side surface of the sub-body and adapted to receive the hinge protrusion;

a hinge-hole arranged on a surface of the second side of the sub-body;

a through-hole arranged on a rotational space accommodating the second side surface of the sub-body to correspond to the hinge-hole; and a hinge locker passing through the through-hole and the hinge-hole; and wherein the hinge locker comprises:

a horizontal portion having a seating surface arranged to be in contact with an inner surface of the sub-body;

a vertical portion having a shaft-forming surface arranged in a direction perpendicular to the seating surface;

a hinge shaft protruding perpendicularly from the shaft-forming surface thereof, the hinge shaft being arranged to pass through the hinge-hole and the through-hole; and a hinge locker seating portion arranged on the inner surface of the sub-body to receive the seating surface of the horizontal portion of the hinge locker.

7. The housing according to claim 6, wherein the horizontal portion of the hinge locker comprises a tension rib having a positioning protrusion arranged on one end thereof;

and wherein the hinge locker seating portion comprises a guide rib protruding therefrom, the guide rib adapted to guide and fix the positioning protrusion;

and wherein the guide rib comprises a front end having a locking groove arranged to lock the positioning protrusion.

8. A housing comprising:

a main body and a sub-body rotatably positioned on the main body;

a first hinge portion adapted to rotatably support first and second lower sides of the sub-body, the first and second lower sides being on a face of the sub-body facing the main body; and a second hinge portion adapted to rotatably support a rear end of the sub-body with a surface contact and to maintain a rotated angle of the sub-body, the sub-body having two ends, a front end having an axis of rotation and a rear end;

wherein the second hinge portion comprises:

a curved portion protruding from a bottom surface of the sub-body and having gear grooves arranged on the surface thereof;

a window arranged on the sub-body rotational space of the main body and passing through the curved portion; and a pinion rotatably positioned at a predetermined position, the pinion arranged to be rotated together with the sub-body upon the sub-body being rotated in engagement with the gear grooves;

wherein the assembly further comprises a boss protruding from the inner surface of the main body from a rear side of the window and a bracket, wherein the pinion has a shaft and is arranged to be rotatable by the boss protruding from the inner surface of the main body from a rear side of the window and by the bracket supported by the boss at a predetermined height and rotatably supporting the shaft of the pinion; and wherein a positioning pin for fixing a mounting position of the bracket is arranged on one side of the boss;

and wherein the bracket comprises a fastening-hole arranged to have a fastening screw passing therethrough to fasten the bracket to the boss; and wherein the bracket comprises a pinhole arranged on one side to receive the positioning pin.

9. The housing according to claim 8, wherein the curved portion has two sets of gear grooves, each set of gear grooves being arranged near a respective edge of the curved portion and wherein at least two pinions are arranged to respectively engage the two sets of gear grooves.

10. A housing comprising:

a main body and a sub-body rotatably positioned on the main body;

a first hinge portion adapted to rotatably support first and second lower sides of the sub-body, the first and second lower sides being on a face of the sub-body facing the main body; and a second hinge portion adapted to rotatably support a rear end of the sub-body with a surface contact and to maintain a rotated angle of the sub-body, the sub-body having two ends, a front end having an axis of rotation and a rear end;

wherein the second hinge portion comprises:

a curved portion protruding from a bottom surface of the sub-body and having gear grooves arranged on the surface thereof;

a window arranged on the sub-body rotational space of the main body and passing through the curved portion; and a pinion rotatably positioned at a predetermined position, the pinion arranged to be rotated together with the sub-body upon the sub-body being rotated in engagement with the gear grooves; and wherein the housing further comprises:

a rib protruding from the main body; and a rotation-preventing threshold arranged on an end portion of the curved portion to limit a rotation of the sub-body by interference with the rib protruding from the main body.

* * * * *